No. 641,325. Patented Jan. 16, 1900.
M. A. REPLOGLE.
MECHANICAL MOVEMENT.
(Application filed Apr. 27, 1899.)
(No Model.)
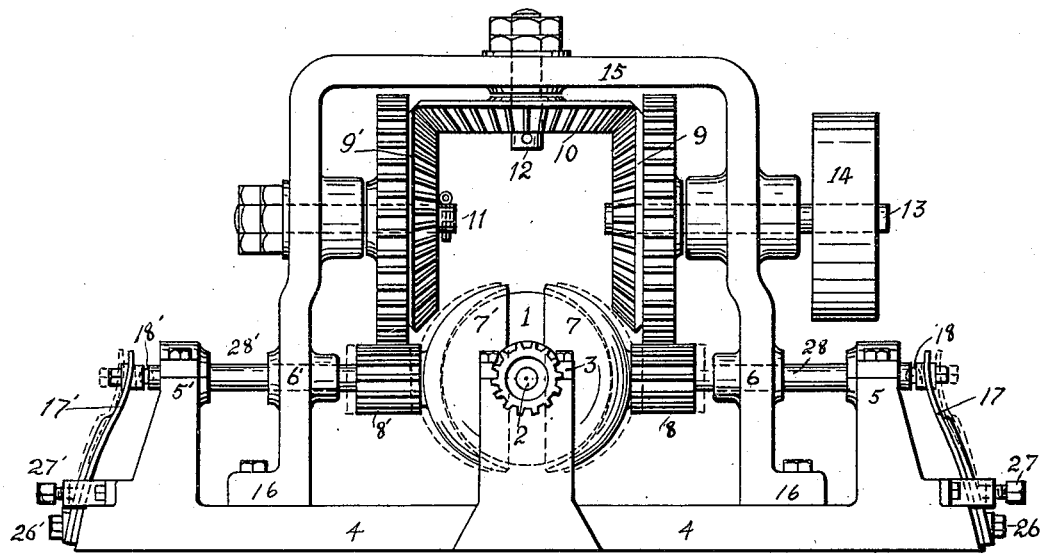
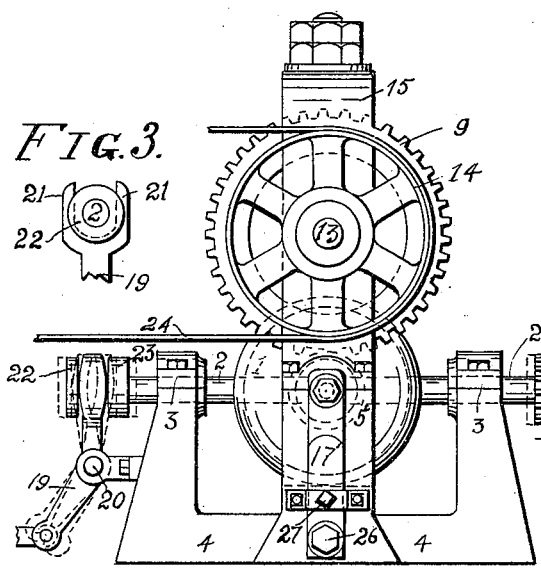
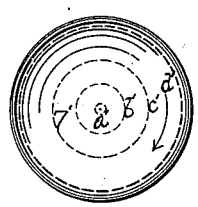
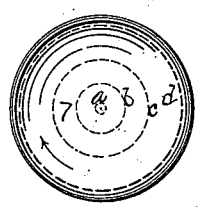
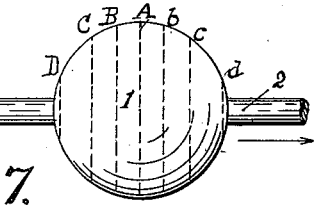
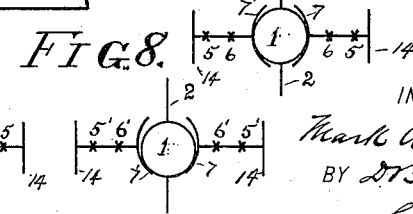
WITNESSES:
A. D. Allen.
Marcus H. Reed.
INVENTOR
Mark A. Replogle
BY D. B. Replogle
his
ATTORNEY.
THE NORRIS PETERS CO., PHOTO-LITHO., WASHINGTON, D. C.

UNITED STATES PATENT OFFICE.

MARK A. REPLOGLE, OF AKRON, OHIO.

MECHANICAL MOVEMENT.

SPECIFICATION forming part of Letters Patent No. 641,325, dated January 16, 1900.

Application filed April 27, 1899. Serial No. 714,638. (No model.)

*To all whom it may concern:*

Be it known that I, MARK A. REPLOGLE, a citizen of the United States, residing at Akron, in the county of Summit and State of Ohio, have invented certain new and useful Improvements in Mechanical Movements, of which the following is a specification, reference being had therein to the accompanying drawings.

This invention relates to mechanical movements wherein power or motion is transmitted from a revolving shaft to another revolving shaft substantially at right angles therewith; and the objects of the invention are to produce a simplified and more efficient construction for the purpose, to provide a means for reversing the direction of revolution of the driven shaft without reversing the driving-shaft, and also to vary the speed in either direction to any required gradation.

My device consists, essentially, of the construction, arrangement, and combination of parts as herein specified, and illustrated in the drawings, in which—

Figure 1 is a side elevation of sufficient parts of a machine to display my movement. Fig. 2 is a view of the same, taken at right angles to that in Fig. 1. Fig. 3 is a detail view of part of the shifting mechanism used in the device. Fig. 4 represents one of the concave disks constituting an essential element in my device. Fig. 5 represents another similar disk, the pair being necessary to operate the device most successfully. Fig. 6 is a view of a sphere mounted on a shaft, constituting one of the principal elements in my device. Fig. 7 is a diagram showing the relations of the concave hemispherical members and sphere when motion is not transmitted. Fig. 8 is a similar diagram showing the relation of the sphere to the concave hemispherical members when medium speed is transmitted in one direction to the sphere. Fig. 9 is a similar diagram illustrating the relation of the concave hemispherical members to the sphere when higher speed is transmitted to the sphere in an opposite direction to that shown in Fig. 8.

In the last three figures mentioned a substitute method of driving the concave hemispherical members is suggested, in that belt-wheels 14 may be keyed directly to the shafts revolving the hemispherical members and the pair of wheels belted to revolve in opposite directions.

Similar figures and letters of reference denote like and corresponding parts throughout the several views.

Referring to the drawings, 1 designates a sphere or substantially a sphere having a regular smooth surface and being securely keyed to a shaft 2, passing diametrically through it, the said shaft journaled to the bearings 3 3 on the frame or base plate 4. Running at right angles to the shaft 2 and opposite the equator of the sphere are two shafts 28 and 28' in line with each other and revolving, respectively, in the bearings 5 6 and 5' 6'. These shafts have mounted on their inner ends hemispherical pieces or disks hollowed out so as nearly to conform with the exterior surface of the sphere which is interposed between them, sufficient space being left for the shaft 2 to revolve between the rims of the hemispherical members. The interior concave surfaces of the hemispherical members are more properly described as being that outlined by a sphere of somewhat greater radius than the sphere 1, with which they are to be used, and they must each be considerably less than a whole hemisphere in order to accommodate the shaft 2, as explained. Contiguous to the concave hemispherical members 7 and 7' are the pinions 8 and 8', keyed to the shafts 28 28', respectively, said pinions being geared with the double cog-gears 9 9', respectively, by means of which, in connection with the bevel-gear 10, the proper motion is transmitted to the hemispherical members from the shaft 13, adapted to be driven by the belt 24 and belt-wheel 14. A frame or yoke 15, bolted to the base-plate 4 at 16 16, serves to complete the framework necessary, and has secured to it pins 11 and 12, on which the double gear 9' and the bevel-gear 10 respectively revolve. The shaft 2 is provided with an elongated pinion 25 at one end adapted to be connected up with any machinery to be driven. The opposite end of the shaft is provided with collars 22 23, interposed between which are the bifurcations 21 21 of a shifting-lever 19, fulcrumed at 20, by means of which lever the shaft 2 may be shifted endwise. At the outer ends of the shafts 28 28' are strong flat springs 17 17', secured at 26 26', and adjustable each by means of set-screws 27 27'. Suitable antifriction-balls 18 18' may be interposed between the ends of the shafts and the impinging portion of the flat springs.

The sphere and concave hemispherical members may have their faces constructed of any suitable friction metal or material, and for lightness the sphere may be cast hollow.

The operation of the device may now be explained. A continuous circular motion in opposite directions is given the concave hemispherical members 7 7' by means of the belt 24, connecting with a suitable driving-shaft. Now when the sphere 1 is centrally located some antipodal points of its equator A will be in the vicinity of $a$ and $a'$ of the concave hemispherical members—that is, opposite points of its equator will be compressed by centers of the disks, but no circular motion will thus be transmitted to the shaft 2; but if the sphere is shifted in the direction of the arrow until compression of the concave hemispherical members is not central, but within lines, as $b$, $c$, or $d$, then it is evident that if there is sufficient pressure the sphere will be revolved at a rate corresponding to the relative size of the circle $b$ or $b'$ of the concave hemispherical members with the circle $b$ of the sphere, and the farther the sphere is pressed in the direction of the arrow the smaller the circle of the sphere which will be in frictional engagement with the hemispherical members and the larger the circle in the hemispherical members which will be in engagement with it, so that if the sphere is pressed in the direction of the arrow until the small circle $d$ engages with the circles $d\ d'$ of the disks, much greater rapidity of revolution will be transmitted than when the frictional contact takes place in the vicinity of the circles $c$ of the sphere and $c\ c'$ of the disks. It must also be noticed that in the $b$ position the springs 17 17' will not be strained so heavily, as not so much pressure is requisite; but in the $c$ and $d$ positions the springs will have their medium and maximum strain, respectively, and it is requisite there in order to effect the same power in the driving-shaft, the leverage on it being less. For motion in the opposite direction the same lines in the hemispherical members engage in like manner with lines B, C, and D when the sphere is shifted from the central position in a direction opposite to that of the arrow, and consequently the driving effect in the inverse direction will be in exact proportion to that of the other position.

From the peculiar construction and operation of the device it is designed to keep itself in order, so far as friction-surfaces are concerned, as the concaves are continually revolving and polishing, as it were, the friction-surface of the sphere and preventing any portions from wearing flat or inefficient. Let it be noticed, for example, that if the hemispherical members and sphere are in position shown in Fig. 7 all points on the equator are equally liable to the friction consequent upon contact with the centers of the revolving hemispherical members; but touching at a mere point at the center of the hemispherical members the friction on the hemispherical members is not very great, and if it wears at all it simply protects itself by getting a larger point of contact, while a shift in either direction immediately distributes the pressure from the center—as, for example, within a small circle $a$ or $a'$—while a considerable shift, as that shown in Fig. 8, will bring all of the frictional contact somewhere between the lines $b$ and $d$, and the longer the lines of frictional engagement the less the frictional effect, and, vice versa, therefore the sphere having short lines of frictional engagement where the hemispherical members have long ones it will wear away in about the correct proportions to maintain a uniform effect for a given amount of shifting. The diagram in Fig. 9 shows the relative positions of the sphere and hemispherical members when shifted to substantially the D position, in which the springs are shifted to the outer ends of their course, as indicated by dotted lines in Fig. 1. The springs operate exactly in the same way, no matter which direction the shaft 2 is shifted. If there is not sufficient pressure to drive the sphere or if the pressure is greater than is necessary to accomplish the work to be done, the springs 17 and 17' are adjusted to the proper tension by means of set-screws 27 and 27', and these springs should press as nearly alike as possible, though it is evident the same effect could be had without the coöperation of one of the hemispherical members; but I prefer to use two hemispherical members, one opposed to the other, as shown, and at about equal pressure upon them, so as to make a sensitive device and to relieve the lateral strain from the bearings 3 of the shaft 2.

The shifting of the shaft 2 endwise may be accomplished according to the necessity of the circumstances in which the device is used.

I have found the device extremely useful in connection with the government of power-supply. In such connection the centrifugal governor may be made to act directly or indirectly on the shaft 2. A drill or cutter-head might also be operated by the device, in which case the change of speed and reversal of motion could be accomplished by direct pressure with the hand or otherwise on the lever 19.

Having thus described the construction and operation of my invention, what I claim, and desire to secure by Letters Patent, is—

1. A mechanical movement comprising a sphere mounted upon a shaft passing diametrically therethrough, and the said sphere and shaft interposed between revolving concaved hemispherical members revolving in opposite directions, the inner concave surfaces thereof being adapted to be pressed into frictional engagement with the convex surface of the sphere for the purpose of transmitting a circular motion, in either direction, to it, substantially as specified.

2. In a mechanical movement the combination of a revoluble shaft, a sphere mounted on the same, a second revoluble shaft at right angles to the first, a hemispherical concave friction member mounted thereon and the convex surface of said sphere being adapted to engage with the concave surface of the said friction member, for the purpose specified.

3. In a mechanical movement a revolving shaft, having a hemispherical concave member axially mounted thereon, a revolving shaft having a spherical body axially mounted thereon, the latter shaft being substantially at right angles to the former and means for shifting the latter shaft so that the convex surface of the said spherical body is brought into frictional engagement with the concave surface of the hemispherical member, substantially as specified.

4. The combination of revolving hemispherical concave members and a spherical body disposed between the concaves of said members and mounted axially on a shaft, the said shaft and sphere being shiftable endwise for the purpose of transmitting circular motion to it from the said members by friction, substantially as specified.

5. A friction-gear comprised in a concaved member mounted axially on a revoluble shaft, the concave surfaces thereof in frictional engagement with a spherical body mounted axially on a revoluble shaft substantially at right angles to the first shaft as specified.

6. In a mechanical movement, a revoluble shaft having a spherical body axially mounted thereon, a pair of opposing hemispherical concave members engaging laterally with the spherical body aforesaid and the said members axially mounted on the ends of revoluble shafts extending at right angles with the shaft aforesaid, in combination with driving mechanism adapted to revolve the said hemispherical members equally in opposite directions for the purpose of transmitting circular motion to the spherical body substantially as specified.

In testimony whereof I affix my signature in presence of two witnesses.

MARK A. REPLOGLE.

Witnesses:
OSBORN ESYATE,
W. OLIVER WISE.